E. C. GILLESPIE.
TAKE-UP DEVICE FOR GUY WIRES.
APPLICATION FILED MAY 16, 1910.
976,865.
Patented Nov. 29, 1910.
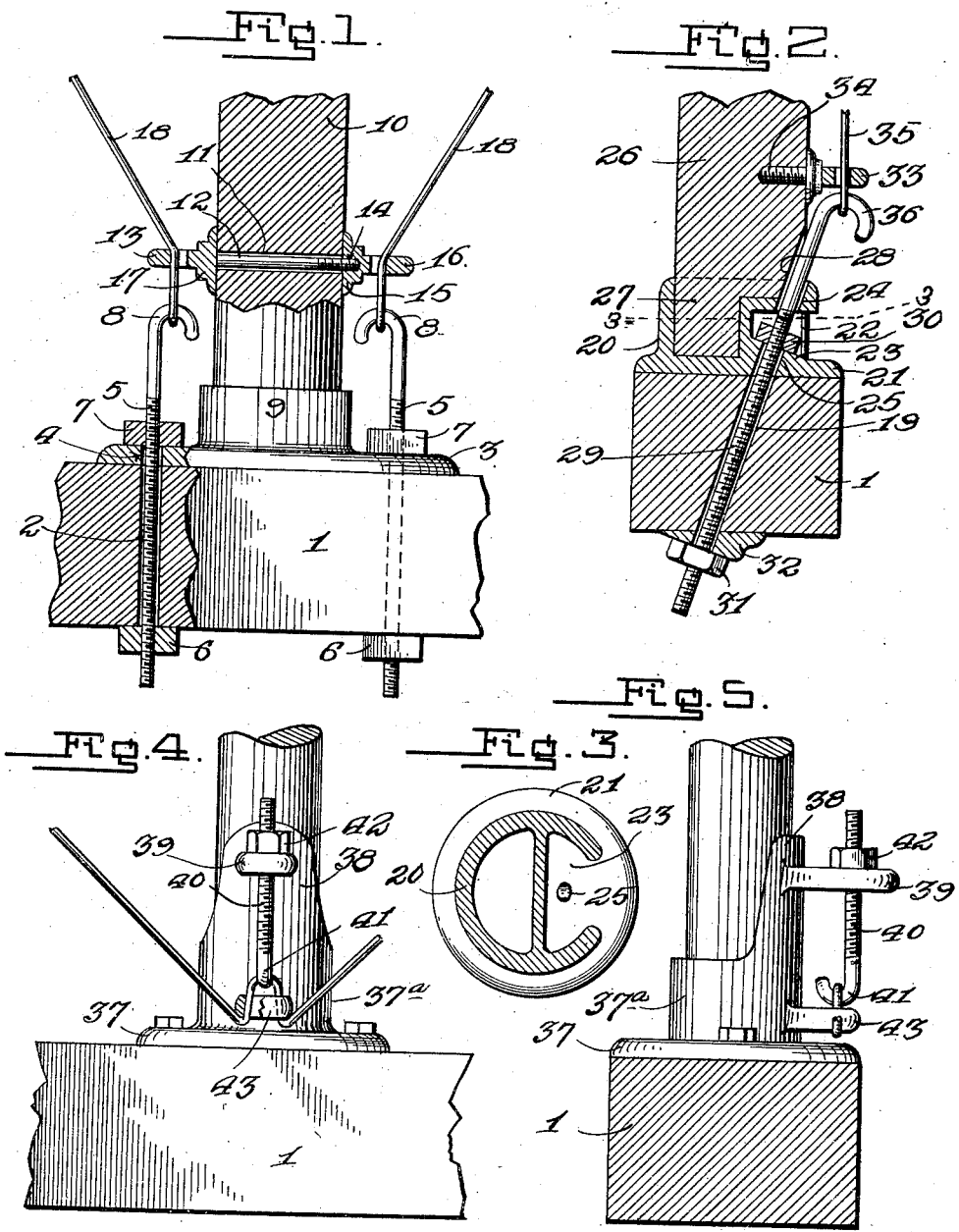
Witnesses
C. Everett Lancaster
H. Joseph Doyle
Inventor
Earl C. Gillespie
By E. E. Trooman,
his Attorney.

UNITED STATES PATENT OFFICE.

EARL C. GILLESPIE, OF WOODHAVEN, NEW YORK.

TAKE-UP DEVICE FOR GUY-WIRES.

976,865.  Specification of Letters Patent.  Patented Nov. 29, 1910.

Application filed May 16, 1910. Serial No. 561,619.

*To all whom it may concern:*

Be it known that I, EARL C. GILLESPIE, a citizen of the United States of America, residing at Woodhaven, Long Island, in the county of Queens and State of New York, have invented certain new and useful Improvements in Take-Up Devices for Guy-Wires, of which the following is a specification, reference being had therein to the accompanying drawing.

This invention relates to means for regulating the tension of guy ropes, cables and the like, such as are used in connection with flying machines, tents, ships, and the like, and the principal object of the same is to provide simple means which may be readily manually adjusted and which will form a firm base connection for the ropes or cables.

In carrying out the objects of the invention generally stated above, it will be understood, of course, that the essential features thereof are necessarily susceptible of changes in details and structural arrangements, certain practical embodiments of which are shown in the accompanying drawings, wherein:—

Figure 1 is a fragmentary view in side elevation, partly in section, showing the practical application of one form of the invention. Fig. 2 is a fragmentary vertical sectional view showing another form of the invention. Fig. 3 is a horizontal sectional view taken on the line 3—3, Fig. 2, the standard and adjusting bolts being omitted. Fig. 4 is a view in front elevation of a further variation of the invention. Fig. 5 is a view in side elevation of the form of the invention shown in Fig. 4.

Referring to said accompanying drawings by numerals, and particularly to Fig. 1 thereof, 1 designates a base support which may be the platform of an aeroplane and which is provided with vertical openings 2. A flat plate 3 is seated on said base 1 and is provided with openings 4 adapted to be placed in alinement with base openings 2 to permit the threaded bolts 5 to be passed through said alined openings. Nuts 6 are carried by the lower portion of bolts 5 for fastening the same to the lower surface of base 1 and similar nuts 7 are carried by the upper portion of the bolts to fasten the bolts to the upper surface of plate 3. Said bolts project well above plate 3 and the upper end of each is provided with a hook 8. As will be obvious, said bolts may be adjusted by manipulating nuts 6 and 7.

Plate 3 is provided with a central upstanding tubular socket 9 for the reception of a supporting standard 10. Said standard is provided with a transverse opening 11 through which the shank 12 of a guiding eye 13 projects. Said shank projects through and beyond opening 11 and is threaded for engagement with a threaded opening 14 formed in the flat base 15 of a guiding eye 16. Guiding eye 13 is also provided with a flat base 17 and as will be obvious, the shank 12 when in threaded engagement with the opening 14 of eye 16 will detachably clamp said eyes 13 and 16 to opposite portions of standard 10 and retain the same in a laterally projecting position relative to standard 10 so that the guy wires or cables 18 may be passed therethrough and have their ends fastened to the hooks 8 of bolts 5.

It will be seen from the foregoing that the bolts 5 and nuts 6 and 7 in addition to providing simple means for regulating the tension of the guys 18, also provide means for detachably locking plate 3 to base 1.

In Fig. 2 the base 1 is provided with an oblique opening 19 and the socket 20 of plate 21 is provided with a recess 22 the bottom 23 of which is on an incline. The top of socket 20 is provided with an opening 24 and the bottom with an opening 25, said openings 24—25 alining with the opening 19 of base 1. The supporting standard 26 has a notched base 27 that fits over the top of recess 22 and has a clearance slot 28 formed through it that is in oblique alinement with openings 19, 24 and 25. An adjusting bolt 29 is passed through alined openings and slot 19, 24, 25 and 28 and by means of the nut 30 that bears upon the inclined bottom 23 of recess 22 and a nut 31 and washer 32 which bear upon the bottom of plate 1, the bolt 29 may be adjustably locked in said openings and slot 19, 24, 25 and 28, and also detachably clamp plate 21 to base 1. Said standard 26 has a laterally projecting eye 33 detachably fastened thereto by means of the threaded shank 34, said eye serving as a guide for the guy 35 which is engaged by the hook 36 of bolt 29.

In Figs. 4 and 5 the base 1 has a plate 37 bolted or otherwise fastened thereto, the said plate provided with a central tubular socket 37ª which is equipped with an upstanding and preferably tapering flange 38. The upper portion of flange 38 is provided with a laterally projecting lug 39 through which a threaded adjusting bolt 40 projects, said bolt having a hook 41 at its lower end. A nut 42 is carried by said bolt and bears upon the upper surface of lug 39. A guiding eye 43 projects laterally from the base of socket 37 in vertical alinement with lug 39, and guides the guy to hook 41. In this form of the invention it will be seen that the guy-adjusting bolt does not lock plate 37 to base 1, and also that by mounting the bolt in a pendent position, the loop of a guy may be engaged, thus providing means for adjusting a single length of guy cable which is employed in connection with two or more parts of a plane of a flying machine, canopy, tent, or the like.

What I claim as my invention is:—

1. A device of the character described comprising a plate provided with a socket, a standard for said socket, cable adjusting bolts carried by said plate and adapted to detachably fasten said plate to a support, and cable guiding means detachably fastened to said standard.

2. A device of the character described comprising a plate provided with a standard socket, cable adjusting bolts for detachably fastening said plate to a support, said bolts provided with a cable-engaging hook at one end, a standard for said socket, and cable guiding eyes detachably connected to said standard.

3. A device of the character described comprising a base provided with a socket, said socket provided with a side recess, said recess having an inclined bottom, obliquely arranged cable engaging means extending through said recess, a nut seated on said inclined bottom and adapted to adjust the cable engaging means, a standard seated in said socket, and cable-guiding means carried by said standard.

In testimony whereof I hereunto affix my signature in presence of two witnesses.

EARL C. GILLESPIE.

Witnesses:
H. C. TORREY,
B. J. KELLY.